United States Patent [19]

O'Dea

[11] Patent Number: 5,242,315

[45] Date of Patent: Sep. 7, 1993

[54] ELECTRICAL-OPTICAL HYBRID CONNECTOR PLUG

[75] Inventor: John O'Dea, Carlsbad, Calif.

[73] Assignee: Puritan-Bennett Corporation, Carlsbad, Calif.

[21] Appl. No.: 886,762

[22] Filed: May 21, 1992

[51] Int. Cl.⁵ .......................................... H01R 33/945
[52] U.S. Cl. .......................................... 439/577; 385/59
[58] Field of Search ..................... 439/577; 385/59, 60

[56] References Cited

U.S. PATENT DOCUMENTS

| | | |
|---|---|---|
| 3,744,128 | 7/1973 | Fisher et al. . |
| 4,303,301 | 12/1981 | Teichert et al. . |
| 4,465,333 | 8/1984 | Caserta et al. . |
| 4,508,416 | 4/1985 | Oftedahl . |
| 4,645,295 | 2/1987 | Pronovost . |
| 4,657,333 | 4/1987 | Anderson . |
| 4,678,264 | 7/1987 | Bowen et al. . |
| 4,721,358 | 1/1988 | Faber et al. . |
| 4,762,388 | 8/1988 | Tanaka et al. . |
| 4,767,168 | 8/1988 | Grandy . |
| 4,767,181 | 8/1988 | McEowen . |
| 4,801,191 | 1/1989 | Nakai et al. . |
| 4,944,568 | 7/1990 | Danbach et al. ............ 439/577 X |
| 5,109,452 | 4/1992 | Selvin et al. . |

FOREIGN PATENT DOCUMENTS

| | | |
|---|---|---|
| 0156608A3 | 10/1985 | European Pat. Off. . |
| 0228063A3 | 7/1987 | European Pat. Off. . |
| 0374136A2 | 6/1990 | European Pat. Off. . |
| 3112078A1 | 10/1982 | Fed. Rep. of Germany . |

Primary Examiner—Eugene F. Desmond
Attorney, Agent, or Firm—Fulwider Patton Lee & Utecht

[57] ABSTRACT

The configuration of its housing facilitates the assembly of a hybrid electrical optical connector plug in order to minimize manufacturing costs and thereby render the plug especially well suited for use with a disposable peripheral device. The housing consists of two snap-together housing halves that cradle the electrical and optical terminals in a properly aligned orientation and prevent their longitudinal as well as radial displacement.

6 Claims, 1 Drawing Sheet

ELECTRICAL-OPTICAL HYBRID CONNECTOR PLUG

BACKGROUND OF THE INVENTION

1. Field of the Invention

The present invention relates to connectors for the simultaneous coupling of a multiplicity of conduits including both optical as well as electrical conduits and more particularly pertains to connectors especially suited for use with disposable devices.

2. Background of the Prior Art

A multitude of devices are disclosed in the prior art that serve to interconnect electrical conductors as well as optic fibers in a single hybrid connector. Combining two such dissimilar interconnecting functions poses special problems as the requirements for making good electrical contact differ from what is involved in achieving a good optical coupling. For example, in order to achieve a good electrical interconnection, it is generally desirable that the contacting surfaces engage in a sweeping motion to clear away any contamination or oxidation that may have accumulated. Once engaged, substantial force is required in order to maintain electrical contact. The optical coupling of two light conducting fibers on the other hand requires extremely precise axial alignment of the respective fiber ends. A lateral offset of just a few microns or an angular misalignment of a few minutes of arc can significantly compromise the transmission of light energy.

The connectors in which both the described requirements for the electrical connection and the precision required for the optical connection are simultaneously achieved typically result in devices that are rather large, complex, difficult to manufacture and expensive, especially when designed for use under harsh conditions. Additionally, such devices can be difficult to manipulate, a problem that is compounding when the connectors are used under adverse circumstances.

The expense inherent in the prior art connectors is especially limiting when a connector is intended for use in conjunction with an expendable or disposable peripheral device. By rearranging the various intercoupling components of prior art connectors such that the relatively more expensive elements remain located within the receptacle component affixed to the retained central device while the relatively inexpensive components are positioned within the plug component that is directly linked to the disposable peripheral device, the critical costs associated with the disposable device are somewhat reduced. Significant labor costs are nonetheless associated with the construction of such a plug component as previous plug configurations called for the assembly of epoxy/polish type ferrules and soldered electrical terminals on and into an armature that subsequently required overmolding in order to preserve the integrity of the plug and afford proper protection for its elements. A need therefore exists to provide a plug component structure that requires a less labor intensive effort for assembly.

SUMMARY OF THE INVENTION

The present invention seeks to overcome the disadvantages inherent in the prior art connectors with the push-pull type electrical-optical hybrid connector described in detail herein below and more specifically seeks to significantly reduce the costs associated with the manufacture of the connector plug component. As a result, the invention provides a connector that is ideally suited for interconnecting an expendable or disposable peripheral device with permanent, expensive equipment and one that is additionally capable of surviving the conditions the peripheral device is expected to be subjected to.

An example of an application for which the connector of the present invention is ideally suited is medical instrumentation which employs a single-use probe electrically and optically interconnected to analyzing equipment. Contamination concerns not only preclude the reuse of the probe, but also requires it to initially undergo sterilization. The harsh conditions of sterilization and the potential misuse or abuse such a device may be subjected to when handled by lay-personnel or by personnel under adverse conditions requires a connector associated therewith to be tough and easy to use.

The connector of the present invention provides a receptacle and plug arrangement wherein the minimization of cost and maximization of the ability to withstand abuse is concentrated in the plug component which is to be permanently affixed to the peripheral device. All of the moving parts, relatively delicate elements, and high-precision surfaces necessary to achieve a proper electrical and optical coupling are accommodated in the receptacle while the plug consists of relatively few, sturdy, and very easily and quickly assembled components constructed of relatively inexpensive materials. As a result, the plug can easily withstand high impact loads, thermal loads, is impervious to harsh chemicals and can be produced at minimal cost.

The plug component serves to positively locate a plurality of electrical and optical terminals in a preselected protruding arrangement for receipt within the respective receiving channels of the receptacle. A hood surrounds the arrangement of protruding terminals and extends substantially beyond their ends to prevent inadvertent contact therewith. Besides protecting the terminals from damage, the hood is formed such that its interior surface engages a structure within the receptacle to guide the terminals toward the receiving orifices during engagement. The exterior surface of the hood is contoured to key the rotational orientation of the plug to that of the receptacle and additionally serves to latch the plug into position within the receptacle once fully engaged.

Central to the minimization of the manufacturing costs of the plug component is the snap-together configuration of its housing. Two housing halves are formed with support cradles therein for positively locating optical fiber ferrules and thermocouple terminal blades in an aligned orientation. The cradles are formed to accommodate either crimp/cleave or crimp/polish ferrules which obviate the need for a time-consuming epoxying operation in their attachment to the optic fibers. The interiors of the housing halves are additionally formed to accommodate either crimp type or screw down thermocouple blades which further obviates the need for a soldering operation. Final assembly of the plug component merely requires the ferrules to be placed on the respective support cradles in one of the housing halves, the thermocouple terminal blades to be set in their respective positions and the second housing half to be snapped into place. The two housing halves cooperate to positively maintain the projecting terminals in the proper configuration for interaction with the receptacle component. The assembly is subsequently tested and in the event a failure is indicated, the housing halves are easily unsnapped from one another to facilitate rectification of the fault. Once the assembly has been deemed functional, a portion of the connector and protruding cable are overmolded to prevent extraction of the cable.

The housing halves are formed of a rigid plastic that provides for a smooth insertion into the receptacle component. A cantilevered snap mechanism formed in one of the exterior surfaces of the shell half serves to retain the plug component within the receptacle component. The plastic is additionally selected to have a high dielectric breakdown strength which provides protection in instances where a patient floats at 4 kV during defribillation.

Other features and advantages of the present invention will become apparent from the following detailed description, taken in conjunction with the accompanying drawings, which illustrate by way of example, the principles of the invention.

DETAILED DESCRIPTION OF THE PREFERRED EMBODIMENT

Figure 1:
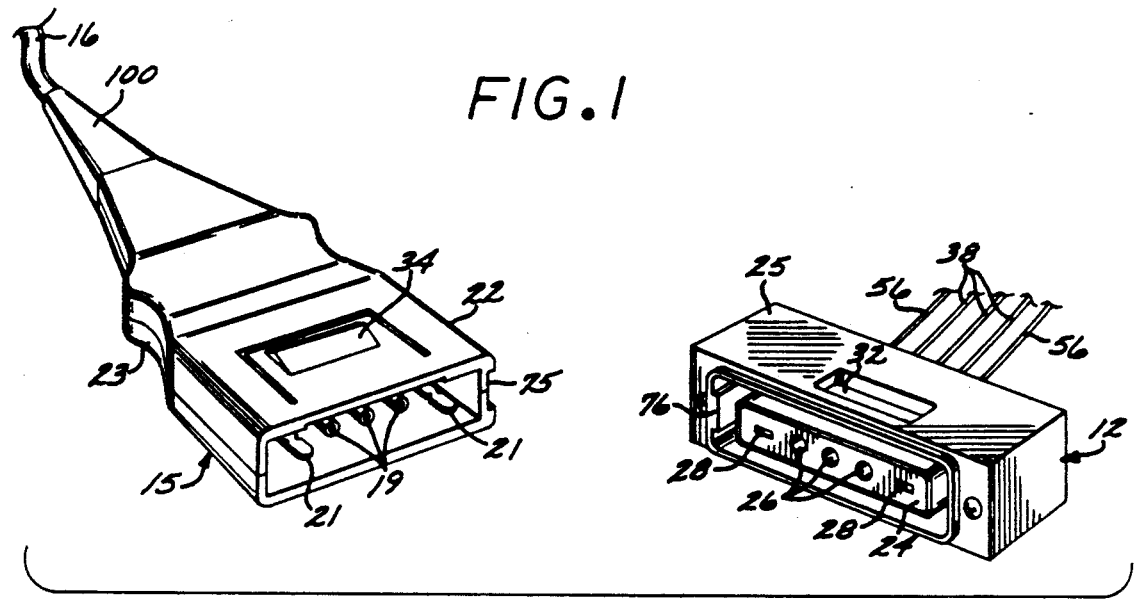
FIG. 1 is a perspective view showing the connector receptacle component and the plug component of the connector of the present invention.

The figures illustrate a preferred embodiment of the connector according to the present invention. The connector serves to interconnect electrical and optical conduits with a push-pull receptacle/plug combination. FIG. 1 illustrates the receptacle component 12 and plug component 15 in an uncoupled state. The receptacle 12 is intended to be directly affixed to an instrument (not shown) or a cable leading directly thereto while the plug 15 is intended to be attached to a disposable peripheral device (not shown) such as a probe or a sensor.

The physical interaction of the plug component with the receptacle component as well as the optical and electrical interaction of the optical and electrical subcomponents is more fully described in U.S. Pat. No. 4,109,452 to Selvin, et al. which is incorporated herein by reference. The present invention provides a plug component which serves the required function of maintaining the individual electrical and optical terminals in an aligned configuration for proper coupling with counterpart terminals contained within the receptacle. Moreover, the plug component accommodates off-the-shelf sub-components therein and is quickly and easily assembled to minimize manufacturing costs associated therewith.

Figure 2:
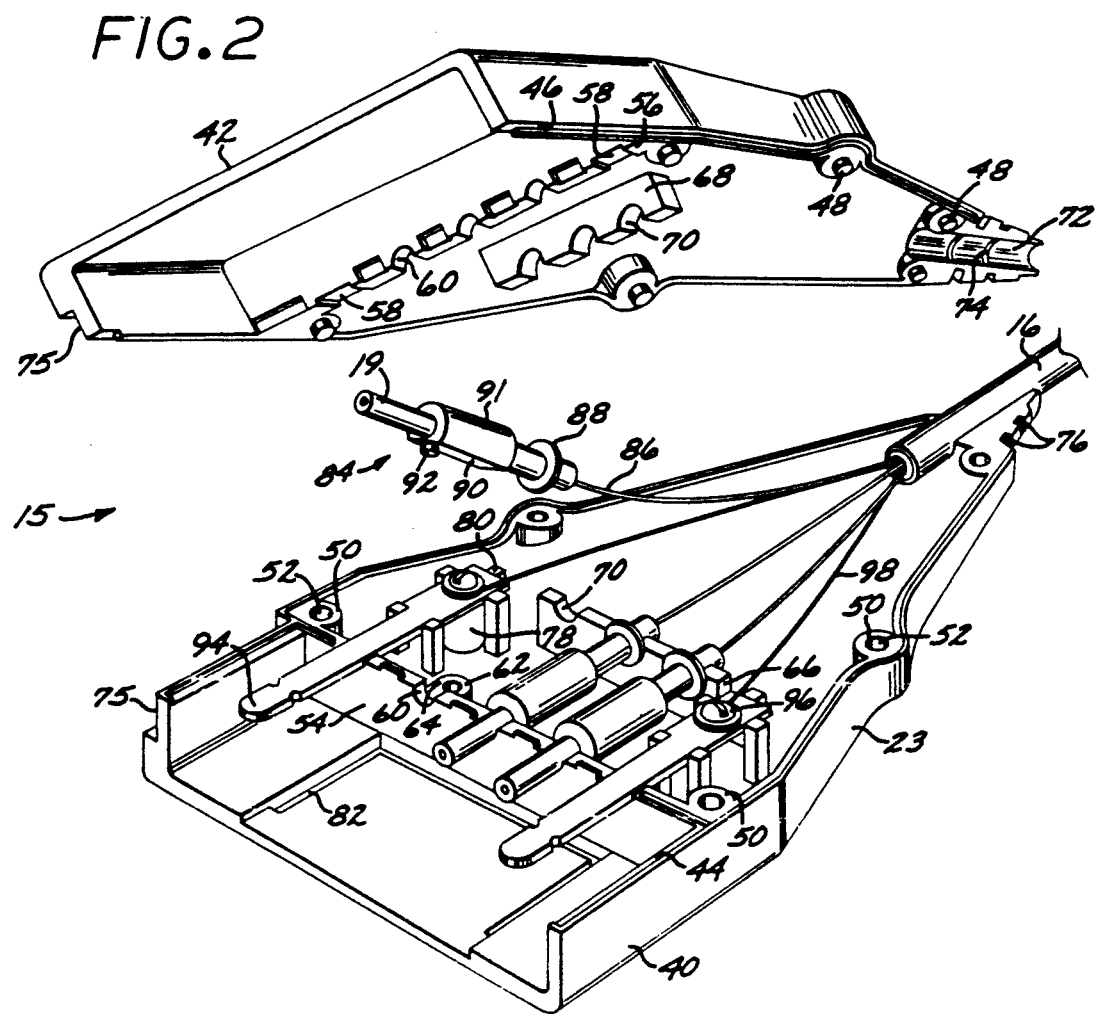
FIG. 2 is an enlarged, exploded, perspective view of a partially assembled connector plug according to the present invention.

FIG. 2 illustrates the plug component 15 of the present invention in a partially assembled state. The plug component housing consists of two housing halves 40, 42, each describing a walled structure open at one end. The tops of the walls of each housing half define mating surfaces 44, 46 each configured to interlock with the other. In the preferred embodiment, the configuration of mating surface 44 consists of an raised outboard ridge extending about the entire housing half 40 while mating surface 46 consists of a raised inboard ridge similarly extending about the entire periphery of the housing half 42. A series of protruding studs 48 are distributed about housing half 42 within its periphery. Each stud extends well beyond the described ridge of mating surface 46. A series of stud receiving structures 50 are similarly distributed within housing half 40. Each stud receiving structure includes a hole 52 dimensioned to receive a corresponding stud 48 to provide an interference fit therewith.

The two housing halves 40, 42 each incorporate a transverse wall 54, 56 therein extending across each housing half and set back with relation to the housing half's open end. Each wall has two electrical terminal blade support cradles 58 and three ferrule support cradles 60 formed therein in a spaced relation. The tops of transverse walls 54, 56 between the individual cradles have ridged interlocking mating surfaces formed therein identical to those employed in the periphery of the connector. A ferrule support platform 62 extends inwardly from transverse wall 54 adjacent each ferrule support cradle 60. Each support platform 62 has a hole 64 centrally formed therein. An interior wall 66, 68 is formed within each housing half. Each interior wall has a series of spaced optical terminal support cradles 70 formed in its top surface. Axes defined by the respective support cradles 60 and 70 are parallel to the longitudinal axis of connector 15. Electrical connector blade support platforms 78 extend inwardly from electrical connector support cradles 58 and provide a flat surface with a screw receiving hole formed therein. Raised posts 80 are formed about the periphery of each support platform.

The proximal ends of housing halves 40, 42 include a cable port 72, the interior surface thereof having a series of transverse ribs 74 formed therein. In the embodiment illustrated, cable 16 carries three optical fibers 86 and two thermocouple wires 98 to a peripheral device. The proximal end of the housing halves additionally has a series of traverse grooves 76 formed in its exterior surface. A latching mound 34 is molded into the exterior surface of housing half 40 and is dimensioned to be received within void 2 of receptacle 12. A groove 82 extends partially around the mound to provide cantilevered support therefor.

Commercially available crimp/cleave or crimp/polish ferrules 84 are attached to the optic fibers 86. In the embodiment illustrated, the ferrule 84 is generally of cylindrical shape with a section of reduced diameter at its distal end defining the optical terminal 19 to be received within receptacle 12. A flange of increased diameter 88 is formed near its proximal end. A portion of the ferrule's cylindrical body 91 is flattened 90 and additionally has radially extending therefrom pin 92. Transverse wall 54 and interior wall 66 are spaced so as to precisely accommodate the distal end of ferrule body 91 and the proximal end of flange 88 therebetween. The ferrule is rotationally oriented such that its flat section bears on support platform 62 while the hole 64 formed within support platform 62 is dimensioned and positioned to receive pin 92.

Each electrical terminal protruding from the plug component is the distal part of terminal blade 94. Screw 96 extending through a hole in the proximal end of blade 94 serves to attach the blade to support platform 78. The screw additionally serves to maintain electrical contact between wire 98 and blade 94. Alternatively, commercially available crimp type thermocouple terminals may be employed which obviate the need for a screw connection. Appropriate support structures molded into the housing halves serve to maintain the thermocouple terminal in position.

In order to assemble the plug component of the present invention, ferrules 84 are first attached to the individual optical fibers 86. A crimping tool is employed to positively attach a ferrule onto each fiber. The distal end is subsequently cleaved and or polished to provide an optically flat and smooth mating surface. Each of the ferrules so assembled are subsequently placed into the support cradles 60 and 70 formed in transverse wall 54 and interior wall 66 such that pins 92 are received with holes 64. Thermocouple connector blades 94 are positioned on top of support cradles 58 and support platform 78. Posts 80 ensure that the blade's orientation is parallel with the connector's longitudinal axis. The respective thermocouple wires are inserted into the hole extending through the thermocouple blade after which screws 96 are inserted therethrough and threaded into receiving holes in platform 78.

With the cable positioned within port 72, housing half 42 is snapped into place. The interference fit between studs 48 and holes 50 in conjunction with the interlocking configuration of the ridges formed on the mating surfaces 44, 46 serve to lock the two housing halves together. Insertion of the plug into a receptacle 12 interconnected to test equipment allows the function of both the probe and the connector to be tested at this point in the plug's assembly. In the event a fault is found in the plug component the housing halves are easily unsnapped from one another and the fault rectified. Once the connector has been found to be fully functional, a thermoplastic elastomer is molded about the proximal end of the assembled housing halves 40, 42 wherein ribs 76 provide a mechanical interlock with the overmolding. The overmolding in conjunction with ribs 74 within port 72 effectively prevents the accidental extraction of the cable from within the assembled connector 15.

The assembled housing halves cooperate to define a slotted hood 22 extending beyond transverse wall 54. Slot 75 requires the plug component 15 to be properly rotationally oriented in order to allow ridge 76 to clear as the plug is inserted into the receptacle 12. The tapered midsection 23 provides a fingergrip to facilitate the manipulation of the plug component relative the receptacle component.

While a particular form of the invention has been illustrated and described, it will also be apparent to those skilled in the art that various modifications can be made without departing form the spirit and scope of the invention. Accordingly, it is not intended that the invention be limited except as by the appended claims.

What is claimed is:

1. A plug component of an electrical optical hybrid connector for coupling a first set of optical conduits and a first set of electrical conduits to a second set of optical conduits and a second set of electrical conduits terminating within a receptacle component, comprising:

a set of ferrules, each ferrule being affixed about an end of one of said first set of optical conduits, each of said ferrules having a distal end dimensioned for receipt within said receptacle component;

a set of thermocouple blades, each of said blades having a distal end dimensioned for receipt within said receptacle component;

a first housing half formed to support said set of ferrules and said set of thermocouple blades in an orientation to enable the distal ends of said ferrules and said blades to be inserted into said receptacle component;

means for simultaneously and detachably securing the electrical conduits to said thermocouple blades and said thermocouple blades to said first housing half; and a second housing half formed to engage said first housing half and cooperate therewith to enclose said ferrules and said blades and prevent their displacement.

2. The plug component of claim 1 wherein said housing halves engage one another in snap-together fashion.

3. The plug component of claim 1 wherein said securing means comprises a screw-type fastener received within said first housing half.

4. The plug component of claim 1 wherein said first housing half has support cradles formed therein that position said ferrules and prevent their longitudinal displacement and further has support structures formed therein to prevent longitudinal displacement of said blades.

5. The plug component of claim 4 wherein said second housing half has support cradles formed therein that prevent longitudinal displacement of said ferrules and cooperate with said support cradles of said first housing half to prevent radial displacement of said ferrules.

6. The plug component of claim 5 wherein said housing halves engage one another in snap-together fashion.

* * * * *

UNITED STATES PATENT AND TRADEMARK OFFICE
CERTIFICATE OF CORRECTION

PATENT NO. : 5,242,315
DATED : September 7, 1993
INVENTOR(S) : John O'Dea

It is certified that error appears in the above-indentified patent and that said Letters Patent is hereby corrected as shown below:

In Column 4, line 39, after "void" delete "2", insert --32--.

Signed and Sealed this

Twentieth Day of December, 1994

Attest:

BRUCE LEHMAN

Attesting Officer      Commissioner of Patents and Trademarks